(12) United States Patent
Latta et al.

(10) Patent No.: US 9,821,224 B2
(45) Date of Patent: Nov. 21, 2017

(54) DRIVING SIMULATOR CONTROL WITH VIRTUAL SKELETON

(75) Inventors: Stephen Latta, Seattle, WA (US); Darren Bennett, Seattle, WA (US); Kevin Geisner, Mercer Island, WA (US); Relja Markovic, Seattle, WA (US); Kudo Tsunoda, Seattle, WA (US); Rhett Mathis, Snohomish, WA (US); Matthew Monson, Kirkland, WA (US); David Gierok, Sammamish, WA (US); William Paul Giese, Snohomish, WA (US); Darrin Brown, Vancouver (CA); Cam McRae, Vancouver (CA); David Seymour, Vancouver (CA); William Axel Olsen, Vancouver (CA); Matthew Searcy, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 231 days.

(21) Appl. No.: 12/975,011

(22) Filed: Dec. 21, 2010

(65) Prior Publication Data
US 2012/0157198 A1   Jun. 21, 2012

(51) Int. Cl.
*A63F 9/24*    (2006.01)
*A63F 13/428*  (2014.01)
(Continued)

(52) U.S. Cl.
CPC .......... *A63F 13/428* (2014.09); *A63F 13/213* (2014.09); *A63F 13/57* (2014.09);
(Continued)

(58) Field of Classification Search
CPC .......... A63F 13/00; A63F 13/06; A63F 13/10; A63F 2300/00; A63F 2300/10;
(Continued)

(56) References Cited

U.S. PATENT DOCUMENTS 4,627,620 A   12/1986   Yang
4,630,910 A   12/1986   Ross et al.
(Continued)

FOREIGN PATENT DOCUMENTS

CN    1157180 A    8/1997
CN    101507876 A   8/2009
(Continued)

OTHER PUBLICATIONS

Andru Edwards. E3 2009: Project Natal Xbox 360 Announcement [online], Jun. 2, 2009 [retrieved May 25, 2016]. Retrieved from the Internet <URL: https://www.youtube.com/watch?v=p2qlHoxPioM>.*

(Continued)

*Primary Examiner* — David L Lewis
*Assistant Examiner* — Chase Leichliter
(74) *Attorney, Agent, or Firm* — Alleman Hall Creasman & Tuttle LLP

(57) ABSTRACT

Depth-image analysis is performed with a device that analyzes a human target within an observed scene by capturing depth-images that include depth information from the observed scene. The human target is modeled with a virtual skeleton including a plurality of joints. The virtual skeleton is used as an input for controlling a driving simulation.

19 Claims, 14 Drawing Sheets

(51) Int. Cl.
  *A63F 13/213* (2014.01)
  *A63F 13/57* (2014.01)
  *A63F 13/803* (2014.01)
  *G09B 9/04* (2006.01)
  *G06F 3/01* (2006.01)
  *A63F 13/212* (2014.01)

(52) U.S. Cl.
  CPC ............ *A63F 13/803* (2014.09); *G06F 3/017* (2013.01); *G09B 9/04* (2013.01); *A63F 13/212* (2014.09); *A63F 2300/1087* (2013.01); *A63F 2300/1093* (2013.01); *A63F 2300/6045* (2013.01); *A63F 2300/6607* (2013.01); *A63F 2300/8017* (2013.01)

(58) Field of Classification Search
  CPC ...... A63F 2300/1062; A63F 2300/1087; A63F 2300/1093; A63F 2300/60; A63F 2300/6045; A63F 2300/64; A63F 2300/65; A63F 2300/66; A63F 2300/6607; A63F 2300/8017; A63F 13/212; A63F 13/213; A63F 13/428; A63F 13/803
  USPC ............ 463/1, 6, 7, 36, 37, 30–33; 345/156, 345/419, 473, 474; 382/128, 154, 103; 703/2, 6; 702/41; 348/169; 715/757
  See application file for complete search history.

(56) References Cited

U.S. PATENT DOCUMENTS

| | | | |
|---|---|---|---|
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |
| 4,843,568 | A | 6/1989 | Krueger et al. |
| 4,893,183 | A | 1/1990 | Nayar |
| 4,901,362 | A | 2/1990 | Terzian |
| 4,925,189 | A | 5/1990 | Braeunig |
| 5,101,444 | A | 3/1992 | Wilson et al. |
| 5,148,154 | A | 9/1992 | MacKay et al. |
| 5,184,295 | A | 2/1993 | Mann |
| 5,229,754 | A | 7/1993 | Aoki et al. |
| 5,229,756 | A | 7/1993 | Kosugi et al. |
| 5,239,463 | A | 8/1993 | Blair et al. |
| 5,239,464 | A | 8/1993 | Blair et al. |
| 5,288,078 | A * | 2/1994 | Capper et al. ................. 463/39 |
| 5,295,491 | A | 3/1994 | Gevins |
| 5,320,538 | A | 6/1994 | Baum |
| 5,347,306 | A | 9/1994 | Nitta |
| 5,385,519 | A | 1/1995 | Hsu et al. |
| 5,405,152 | A | 4/1995 | Katanics et al. |
| 5,417,210 | A | 5/1995 | Funda et al. |
| 5,423,554 | A | 6/1995 | Davis |
| 5,454,043 | A | 9/1995 | Freeman |
| 5,469,740 | A | 11/1995 | French et al. |
| 5,495,576 | A | 2/1996 | Ritchey |
| 5,516,105 | A | 5/1996 | Eisenbrey et al. |
| 5,524,637 | A | 6/1996 | Erickson |
| 5,534,917 | A | 7/1996 | MacDougall |
| 5,563,988 | A | 10/1996 | Maes et al. |
| 5,577,981 | A | 11/1996 | Jarvik |
| 5,580,249 | A | 12/1996 | Jacobsen et al. |
| 5,594,469 | A | 1/1997 | Freeman et al. |
| 5,597,309 | A | 1/1997 | Riess |
| 5,616,078 | A * | 4/1997 | Oh ................. 463/8 |
| 5,617,312 | A | 4/1997 | Iura et al. |
| 5,638,300 | A | 6/1997 | Johnson |
| 5,641,288 | A | 6/1997 | Zaenglein |
| 5,682,196 | A | 10/1997 | Freeman |
| 5,682,229 | A | 10/1997 | Wangler |
| 5,690,582 | A | 11/1997 | Ulrich et al. |
| 5,703,367 | A | 12/1997 | Hashimoto et al. |
| 5,704,837 | A | 1/1998 | Iwasaki et al. |
| 5,715,834 | A | 2/1998 | Bergamasco et al. |
| 5,875,108 | A | 2/1999 | Hoffberg et al. |
| 5,877,803 | A | 3/1999 | Wee et al. |
| 5,913,727 | A * | 6/1999 | Ahdoot ................. 463/39 |
| 5,933,125 | A | 8/1999 | Fernie |
| 5,980,256 | A | 11/1999 | Carmein |
| 5,989,157 | A | 11/1999 | Walton |
| 5,995,649 | A | 11/1999 | Marugame |
| 6,005,548 | A | 12/1999 | Latypov et al. |
| 6,009,210 | A | 12/1999 | Kang |
| 6,054,991 | A | 4/2000 | Crane et al. |
| 6,066,075 | A | 5/2000 | Poulton |
| 6,072,494 | A | 6/2000 | Nguyen |
| 6,073,489 | A | 6/2000 | French et al. |
| 6,077,201 | A | 6/2000 | Cheng et al. |
| 6,078,329 | A * | 6/2000 | Umeki et al. ................. 345/419 |
| 6,098,458 | A | 8/2000 | French et al. |
| 6,100,896 | A | 8/2000 | Strohecker et al. |
| 6,101,289 | A | 8/2000 | Kellner |
| 6,128,003 | A | 10/2000 | Smith et al. |
| 6,130,677 | A | 10/2000 | Kunz |
| 6,141,463 | A | 10/2000 | Covell et al. |
| 6,147,678 | A | 11/2000 | Kumar et al. |
| 6,152,856 | A | 11/2000 | Studor et al. |
| 6,159,100 | A | 12/2000 | Smith |
| 6,173,066 | B1 | 1/2001 | Peurach et al. |
| 6,181,343 | B1 | 1/2001 | Lyons |
| 6,188,777 | B1 | 2/2001 | Darrell et al. |
| 6,215,890 | B1 | 4/2001 | Matsuo et al. |
| 6,215,898 | B1 | 4/2001 | Woodfill et al. |
| 6,226,396 | B1 | 5/2001 | Marugame |
| 6,229,913 | B1 | 5/2001 | Nayar et al. |
| 6,256,033 | B1 | 7/2001 | Nguyen |
| 6,256,400 | B1 | 7/2001 | Takata et al. |
| 6,283,860 | B1 | 9/2001 | Lyons et al. |
| 6,289,112 | B1 | 9/2001 | Jain et al. |
| 6,299,308 | B1 | 10/2001 | Voronka et al. |
| 6,308,565 | B1 | 10/2001 | French et al. |
| 6,316,934 | B1 | 11/2001 | Amorai-Moriya et al. |
| 6,363,160 | B1 | 3/2002 | Bradski et al. |
| 6,384,819 | B1 | 5/2002 | Hunter |
| 6,411,744 | B1 | 6/2002 | Edwards |
| 6,430,997 | B1 | 8/2002 | French et al. |
| 6,476,834 | B1 | 11/2002 | Doval et al. |
| 6,496,598 | B1 | 12/2002 | Harman |
| 6,503,195 | B1 | 1/2003 | Keller et al. |
| 6,539,931 | B2 | 4/2003 | Trajkovic et al. |
| 6,570,555 | B1 | 5/2003 | Prevost et al. |
| 6,633,294 | B1 | 10/2003 | Rosenthal et al. |
| 6,640,202 | B1 | 10/2003 | Dietz et al. |
| 6,661,918 | B1 | 12/2003 | Gordon et al. |
| 6,681,031 | B2 | 1/2004 | Cohen et al. |
| 6,714,665 | B1 | 3/2004 | Hanna et al. |
| 6,731,799 | B1 | 5/2004 | Sun et al. |
| 6,738,066 | B1 | 5/2004 | Nguyen |
| 6,750,866 | B1 | 6/2004 | Anderson |
| 6,765,726 | B2 | 7/2004 | French et al. |
| 6,788,809 | B1 | 9/2004 | Grzeszczuk et al. |
| 6,801,637 | B2 | 10/2004 | Voronka et al. |
| 6,873,723 | B1 | 3/2005 | Aucsmith et al. |
| 6,876,496 | B2 | 4/2005 | French et al. |
| 6,937,742 | B2 | 8/2005 | Roberts et al. |
| 6,950,534 | B2 | 9/2005 | Cohen et al. |
| 7,003,134 | B1 | 2/2006 | Covell et al. |
| 7,036,094 | B1 | 4/2006 | Cohen et al. |
| 7,038,855 | B2 | 5/2006 | French et al. |
| 7,039,676 | B1 | 5/2006 | Day et al. |
| 7,042,440 | B2 | 5/2006 | Pryor et al. |
| 7,050,606 | B2 | 5/2006 | Paul et al. |
| 7,058,204 | B2 | 6/2006 | Hildreth et al. |
| 7,060,957 | B2 | 6/2006 | Lange et al. |
| 7,113,918 | B1 | 9/2006 | Ahmad et al. |
| 7,121,946 | B2 | 10/2006 | Paul et al. |
| 7,170,492 | B2 | 1/2007 | Bell |

(56) References Cited

U.S. PATENT DOCUMENTS

| | | | |
|---|---|---|---|
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,775,882 B2 * | 8/2010 | Kawamura et al. | 463/32 |
| 7,809,167 B2 | 10/2010 | Bell | |
| 7,834,846 B1 | 11/2010 | Bell | |
| 7,843,429 B2 * | 11/2010 | Pryor | 345/158 |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,385,596 B2 * | 2/2013 | Latta et al. | 382/103 |
| 2002/0065121 A1 * | 5/2002 | Fukunaga et al. | 463/8 |
| 2004/0266506 A1 | 12/2004 | Herbrich et al. | |
| 2005/0206610 A1 * | 9/2005 | Cordelli | 345/156 |
| 2006/0202953 A1 * | 9/2006 | Pryor et al. | 345/156 |
| 2007/0155502 A1 * | 7/2007 | Wu | 463/37 |
| 2008/0026838 A1 | 1/2008 | Dunstan et al. | |
| 2008/0096654 A1 * | 4/2008 | Mondesir et al. | 463/31 |
| 2008/0122786 A1 * | 5/2008 | Pryor et al. | 345/156 |
| 2008/0211771 A1 * | 9/2008 | Richardson | 345/158 |
| 2008/0225041 A1 | 9/2008 | El Dokor et al. | |
| 2009/0027337 A1 * | 1/2009 | Hildreth | 345/158 |
| 2010/0199230 A1 | 8/2010 | Latta et al. | |
| 2010/0238182 A1 * | 9/2010 | Geisner et al. | 345/474 |
| 2010/0241998 A1 | 9/2010 | Latta et al. | |
| 2010/0245233 A1 * | 9/2010 | Hammarling et al. | 345/156 |
| 2010/0277489 A1 * | 11/2010 | Geisner et al. | 345/581 |
| 2010/0278393 A1 * | 11/2010 | Snook et al. | 382/107 |
| 2010/0279762 A1 * | 11/2010 | Sohn et al. | 463/23 |
| 2010/0302138 A1 * | 12/2010 | Poot et al. | 345/156 |
| 2010/0302247 A1 * | 12/2010 | Perez et al. | 345/440 |
| 2011/0009241 A1 * | 1/2011 | Lane et al. | 482/8 |
| 2011/0125362 A1 * | 5/2011 | Matsunaga | B60W 40/08 701/31.4 |
| 2012/0188237 A1 * | 7/2012 | Han | A63F 13/10 345/419 |

FOREIGN PATENT DOCUMENTS

| | | |
|---|---|---|
| CN | 101513573 A | 8/2009 |
| CN | 101667346 A | 3/2010 |
| CN | 101739715 A | 6/2010 |
| CN | 201254344 B | 6/2010 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Dudley, Brier. E3: New info on Microsoft's Natal—how it works, multiplayer and PC versions [online], Jun. 3, 2009 [retrieved on May 25, 2016]. Retrieved from the Internet <URL: http://blogs.seattletimes.com/brierdudley/2009/06/03/e3_new_info_on_microsofts_nata/>.*

Followfail15. Kinect Fail [online], Nov. 22, 2010 [retrieved on May 25, 2016]. Retrieved from the Internet <URL: https://www.youtube.com/watch?v=57NbsAwFhZl>.*

Spazio Hardware. Forza Motorsport 3 Kinect Demo E3 2010 [online], Sep. 15, 2010 [retrieved on May 25, 2016]. Retrieved from the Internet <URL: https://www.youtube.com/watch?v=8irixlb1NJA>.*

Machinima. E3 2010 Coverage—Kinect Joy Ride Demo (Microsoft E3 Press Conference 2010) [online], Jun. 14, 2010 [retrieved May 25, 2016]. Retrieved from the Internet <URL: https://www.youtube.com/watch?v=LRQFJHx-rvM>.*

Schlattmann, et al., "Real-Time Bare-Hands-Tracking for 3d Games", Retrieved at << http://cg.cs.uni-bonn.de/aigaion2root/attachments/schlattmann-2009-games.pdf >>, In proceedings of IADIS International Conference Game and Entertainment Technologies, Jun. 2009, pp. 9.

Lu, et al., "A Vision Based Game Control Method", Retrieved at << http://www.springerlink.com/content/eu47lb4wk30naf89/ >>, Computer Vision in Human-Computer Interaction, ICCV, Workshop on HCI, Oct. 21, 2005, pp. 3.

Hardenberg, et al., "Bare-Hand Human-Computer Interaction", Retrieved at << http://www.cs.loyola.edu/~lawrie/CS774/S06/research/p29-von_hardenberg.pdf >>, Workshop on Perceptive User Interfaces, Nov. 15-16, 2001, pp. 1-8.

Ren, et al., "Immersive and Perceptual Human-Computer Interaction Using Computer Vision Techniques", Retrieved at << http://ieeexplore.ieee.org/stamp/stamp.jsp?tp=&arnumber=5543161 >>, IEEE Computer Society Conference on Computer Vision and Pattern Recognition Workshops (CVPRW), Jun. 13-18, 2010, pp. 66-72.

Punchihewa, et al., "Vision based game controller interface", Retrieved at << http://ieeexplore.ieee.org/stamp/stamp.jsp?arnumber=04803973 >>, Proceedings of the 4th International Conference on Autonomous Robots and Agents, Feb. 10-12, 2009, pp. 261-266.

Chai, et al., "Vision-based real-time game interface", Retrieved at << http://ieeexplore.ieee.org/stamp/stamp.jsp?arnumber=05293605 >>, International IEEE Consumer Electronics Society's Games Innovations Conference, Aug. 25-28, 2009, pp. 43-46.

"Gestural Interfaces", Retrieved at << http://smallminddesign.com/gestural-interfaces/ >>, Jul. 27, 2009, pp. 9.

"Body Scan", U.S. Appl. No. 12/363,542, filed Jan. 30, 2009, pp. 1-27.

"Xbox 360 Project Natal First Look Trailer (E3 2009)," YouTube video posted by user iSOOL3Y, <http://www.youtube.com/watch?v=r0lqdRTDJQc>, Posted date: Jun. 1, 2009 , Access date: Nov. 4, 2010, 2 pages.

(56) References Cited

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.
Miyagawa et al., "CCD-Based Range Finding Sensor", Oct. 1997, pp. 1648-1652, vol. 44 No. 10, IEEE Transactions on Electron Devices.
Rosenhahn et al., "Automatic Human Model Generation", 2005, pp. 41-48, University of Auckland (CITR), New Zealand.
Aggarwal et al., "Human Motion Analysis: A Review", IEEE Nonrigid and Articulated Motion Workshop, 1997, University of Texas at Austin, Austin, TX.
Shao et al., "An Open System Architecture for a Multimedia and Multimodal User Interface", Aug. 24, 1998, Japanese Society for Rehabilitation of Persons with Disabilities (JSRPD), Japan.
Kohler, "Special Topics of Gesture Recognition Applied in Intelligent Home Environments", In Proceedings of the Gesture Workshop, 1998, pp. 285-296, Germany.
Kohler, "Vision Based Remote Control in Intelligent Home Environments", University of Erlangen-Nuremberg/Germany, 1996, pp. 147-154, Germany.
Kohler, "Technical Details and Ergonomical Aspects of Gesture Recognition applied in Intelligent Home Environments", 1997, Germany.
Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
Qian et al., "A Gesture-Driven Multimodal Interactive Dance System", Jun. 2004, pp. 1579-1582, IEEE International Conference on Multimedia and Expo (ICME), Taipei, Taiwan.
Zhao, "Dressed Human Modeling, Detection, and Parts Localization", 2001, The Robotics Institute, Carnegie Mellon University, Pittsburgh, PA.
He, "Generation of Human Body Models", Apr. 2005, University of Auckland, New Zealand.
Isard et al., "Condensation—Conditional Density Propagation for Visual Tracking", 1998, pp. 5-28, International Journal of Computer Vision 29(1), Netherlands.
Livingston, "Vision-based Tracking with Dynamic Structured Light for Video See-through Augmented Reality", 1998, University of North Carolina at Chapel Hill, North Carolina, USA.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Breen et al., "Interactive Occlusion and Collusion of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
State Intellectual Property Office of China, Office Action of Chinese Patent Application No. 201110430860.5, Dec. 3, 2013, 12 pages.
State Intellectual Property Office of the People's Republic of China, Second Office Action dated in Chinese Patent Application No. 201110430860.5, Jul. 17, 2014, 10 Pages.

* cited by examiner

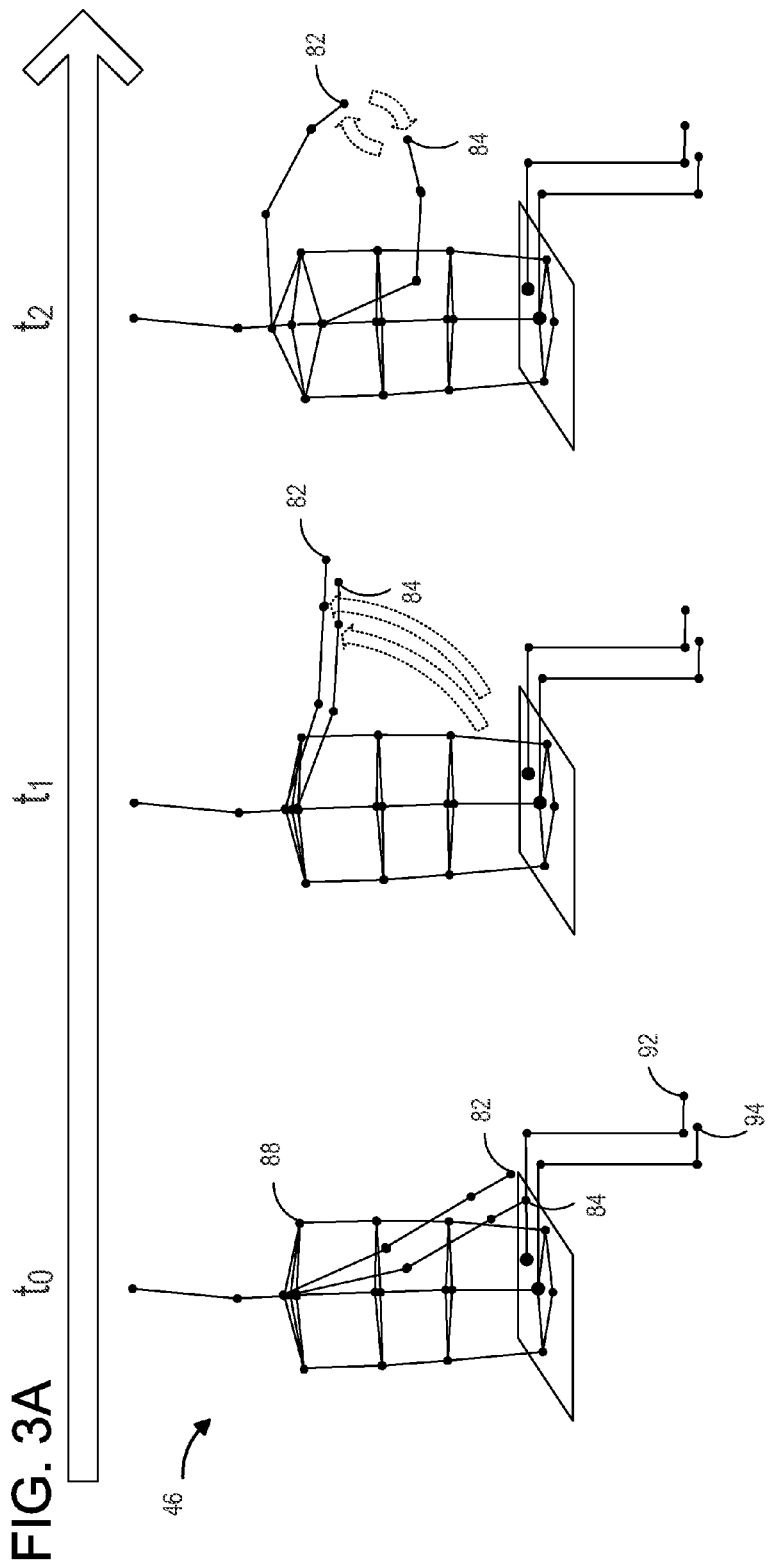

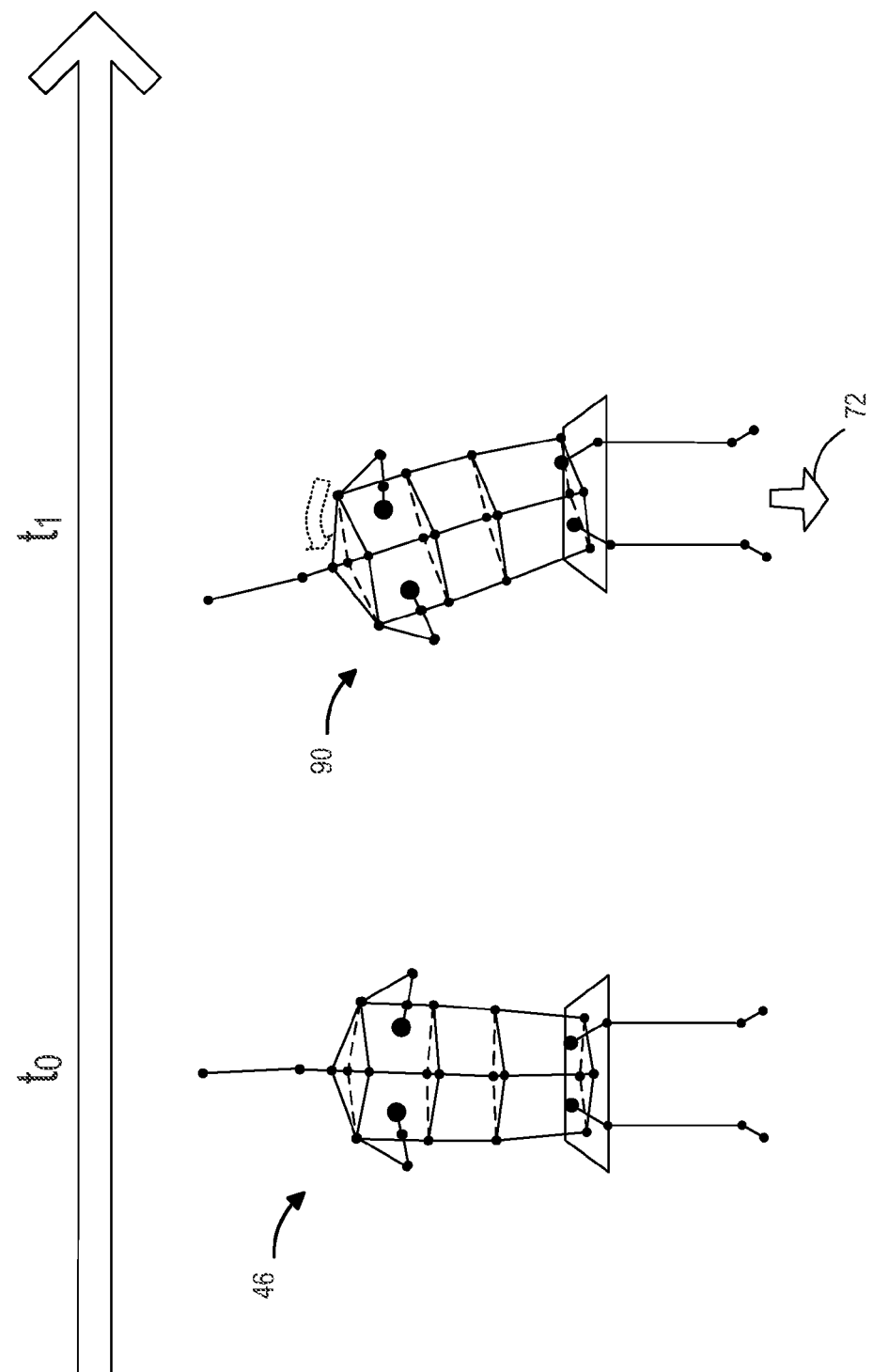

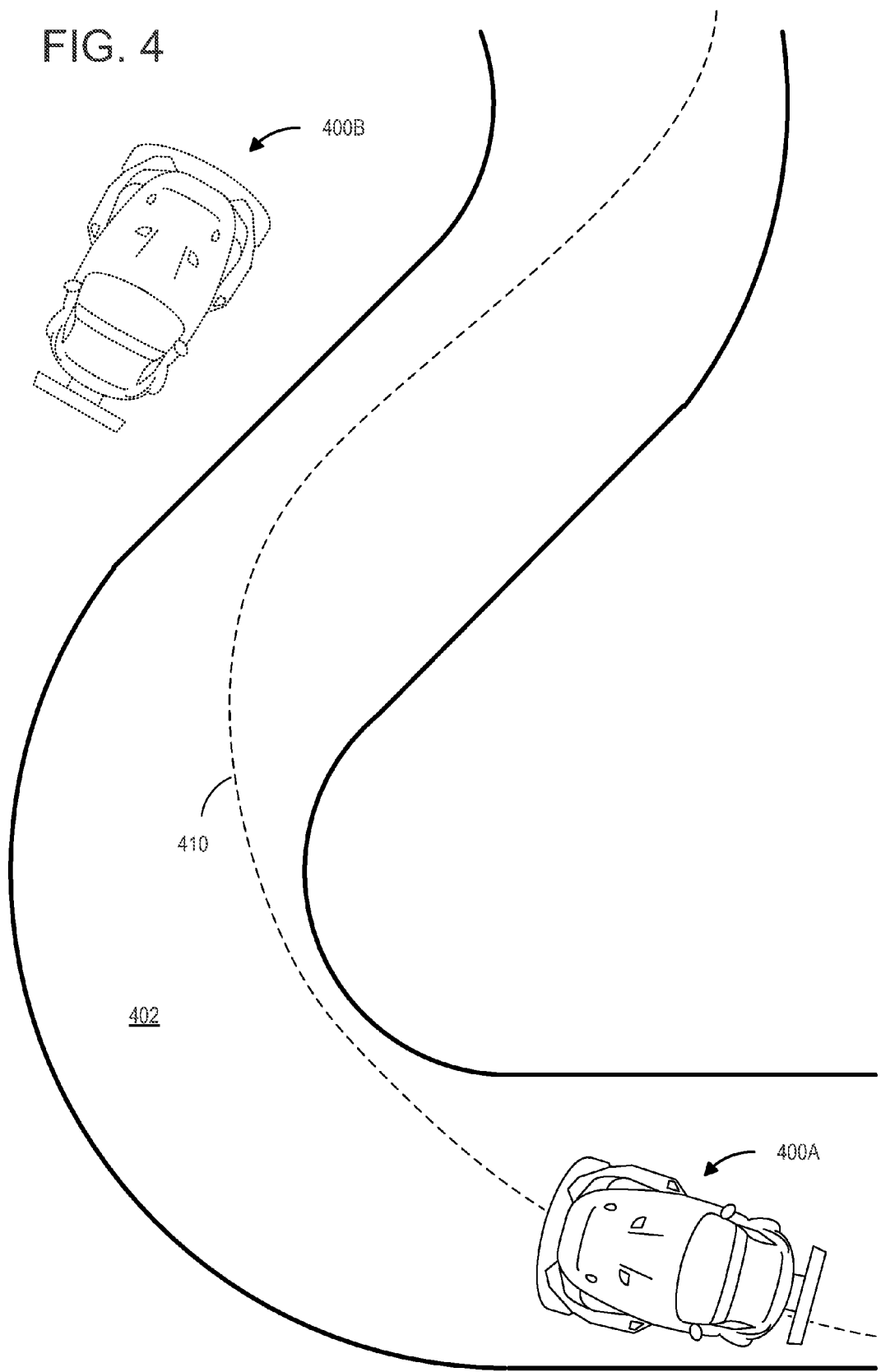

US 9,821,224 B2

DRIVING SIMULATOR CONTROL WITH VIRTUAL SKELETON

BACKGROUND

While camera technology allows images of humans to be recorded, computers have traditionally not been able to use such images to accurately assess how a human is moving within the images. Recently, technology has advanced such that some aspects of a human's movements may be interpreted with the assistance of a plurality of special cameras and one or more tracking tags. For example, an actor may be carefully adorned with several tracking tags (e.g., retro-reflectors) that can be tracked with several cameras from several different positions. Triangulation can then be used to calculate the three-dimensional position of each reflector. Because the tags are carefully positioned on the actor, and the relative position of each tag to a corresponding part of the actor's body is known, the triangulation of the tag position can be used to infer the position of the actor's body. However, this technique requires special reflective tags, or other markers, to be used.

In science fiction movies, computers have been portrayed as intelligent enough to actually view human beings and interpret the motions and gestures of the human beings without the assistance of reflective tags or other markers. However, such scenes are created using special effects in which an actor carefully plays along with a predetermined movement script that makes it seem as if the actor is controlling the computer's scripted actions. The actor is not actually controlling the computer, but rather attempting to create the illusion of control.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Depth-image analysis is performed with a device that analyzes a human target within an observed scene by capturing depth-images that include depth information from the observed scene. The human target is modeled with a virtual skeleton including a plurality of joints. The virtual skeleton is used as an input for controlling a driving simulation.

BRIEF DESCRIPTION OF THE DRAWINGS

FIGS. 3A-3F somewhat schematically show gestured steering angle controls as translated from a virtual skeleton.

FIG. 4 shows a virtual vehicle driving in accordance with an embodiment of the present disclosure.

DETAILED DESCRIPTION

A depth-image analysis system, such as a 3D-vision gaming system, may include a depth camera capable of observing one or more players. As the depth camera captures images of a player within an observed scene, those images may be interpreted and modeled with one or more virtual skeletons. As described in more detail below, the virtual skeletons may be used as an input for controlling a driving simulator. In other words, a depth camera can observe and model a human that is performing gestures designed to control a driving simulator, and the human target can be modeled with a virtual skeleton that the driving simulator can interpret as different controls. In this way, the human can control the driving simulator with gestures alone, avoiding conventional steering wheel, pedal, joystick, and/or other controllers.

Figure 1:
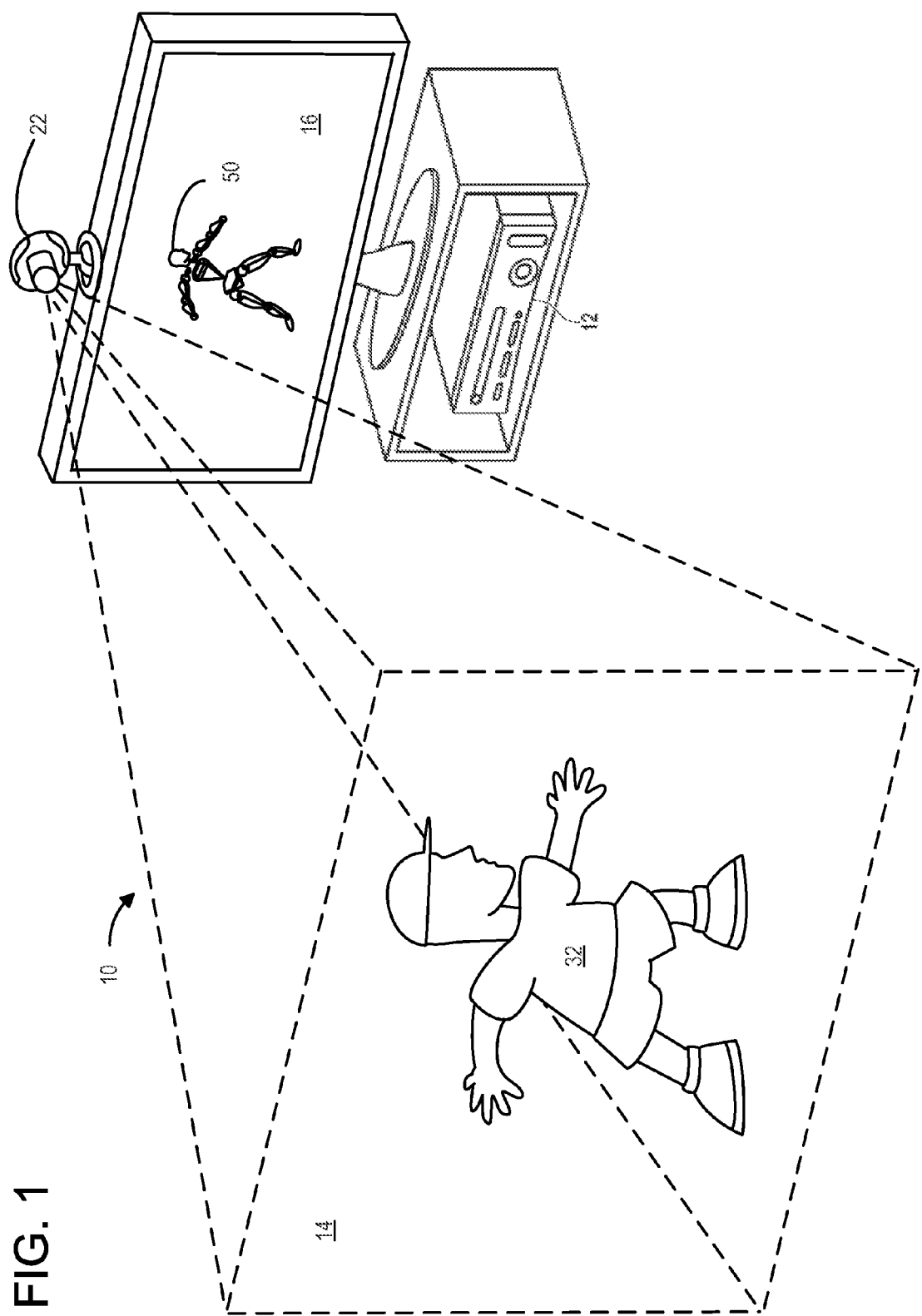
FIG. 1 shows a depth-image analysis system viewing an observed scene in accordance with an embodiment of the present disclosure.

FIG. 1 shows a nonlimiting example of a depth-image analysis system 10. In particular, FIG. 1 shows a gaming system 12 that may be used to play a variety of different games, play one or more different media types, and/or control or manipulate non-game applications and/or operating systems. FIG. 1 also shows a display device 16 such as a television or a computer monitor, which may be used to present game visuals to game players. As one example, display device 16 may be used to visually present a virtual avatar 50 that human target 32 controls with his movements. The depth-image analysis system 10 may include a capture device, such as a depth camera 22, that visually monitors or tracks human target 32 within an observed scene 14. Depth camera 22 is discussed in greater detail with respect to FIGS. 2 and 10.

Human target 32 is shown here as a game player within observed scene 14. Human target 32 is tracked by depth camera 22 so that the movements of human target 32 may be interpreted by gaming system 12 as controls that can be used to affect the game being executed by gaming system 12. In other words, human target 32 may use his or her movements to control the game. The movements of human target 32 may be interpreted as virtually any type of game control. Some movements of human target 32 may be interpreted as controls that serve purposes other than controlling virtual avatar 50. As nonlimiting examples, movements of human target 32 may be interpreted as controls that steer a virtual racing car, shoot a virtual weapon, navigate a first-person perspective through a virtual world, or manipulate various aspects of a simulated world. Movements may also be interpreted as auxiliary game management controls. For example, human target 32 may use movements to end, pause, save, select a level, view high scores, communicate with other players, etc.

Depth camera 22 may also be used to interpret target movements as operating system and/or application controls that are outside the realm of gaming. Virtually any controllable aspect of an operating system and/or application may be controlled by movements of a human target 32. The illustrated scenario in FIG. 1 is provided as an example, but is not meant to be limiting in any way. To the contrary, the illustrated scenario is intended to demonstrate a general concept, which may be applied to a variety of different applications without departing from the scope of this disclosure.

The methods and processes described herein may be tied to a variety of different types of computing systems. FIG. 1 shows a nonlimiting example in the form of gaming system 12, display device 16, and depth camera 22. In general, a depth-image analysis system may include a computing system 60, shown in simplified form in FIG. 10, which will be discussed in greater detail below.

Figure 2:
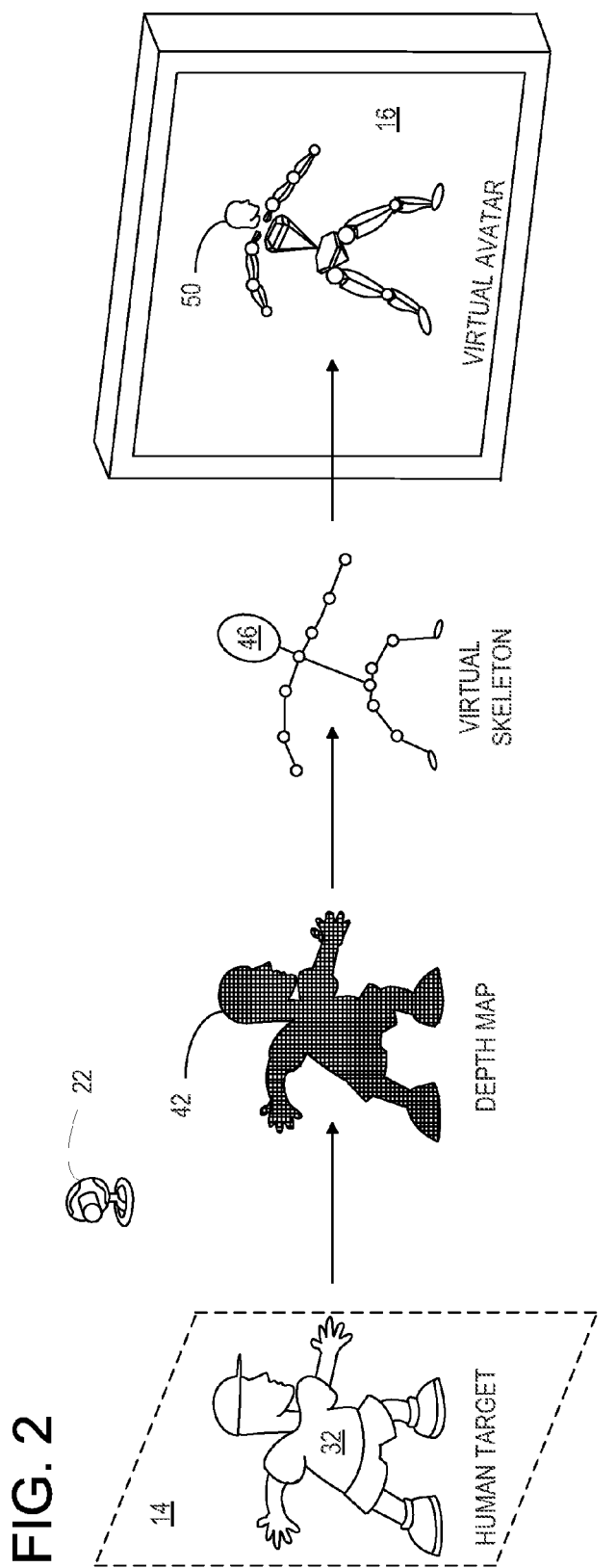
FIG. 2 somewhat schematically shows the modeling of a human target with a virtual skeleton.

FIG. 2 shows a simplified processing pipeline in which human target 32 in an observed scene 14 is modeled as a virtual skeleton 46 that can be used to draw a virtual avatar 50 on display device 16 and/or serve as a control input for controlling other aspects of a game, application, and/or operating system. It will be appreciated that a processing pipeline may include additional steps and/or alternative steps than those depicted in FIG. 2 without departing from the scope of this disclosure.

As shown in FIG. 2, human target 32 and the rest of observed scene 14 may be imaged by a capture device such as depth camera 22. The depth camera may determine, for each pixel, the depth of a surface in the Observed scene relative to the depth camera. Virtually any depth finding technology may be used without departing from the scope of this disclosure. Example depth finding technologies are discussed in more detail with reference to capture device 68 of FIG. 10.

The depth information determined for each pixel may be used to generate a depth map 42. Such a depth map may take the form of virtually any suitable data structure, including but not limited to a matrix that includes a depth value for each pixel of the observed scene. In FIG. 2, depth map 42 is schematically illustrated as a pixelated grid of the silhouette of human target 32. This illustration is for simplicity of understanding, not technical accuracy. It is to be understood that a depth map generally includes depth information for all pixels, not just pixels that image the human target 32, and that the perspective of depth camera 22 would not result in the silhouette depicted in FIG. 2.

Virtual skeleton 46 may be derived from depth map 42 to provide a machine readable representation of human target 32. In other words, virtual skeleton 46 is derived from depth map 42 to model human target 32. The virtual skeleton 46 may be derived from the depth map in any suitable manner. In some embodiments, one or more skeletal fitting algorithms may be applied to the depth map. The present disclosure is compatible with virtually any skeletal modeling techniques.

The virtual skeleton 46 may include a plurality of joints, each joint corresponding to a portion of the human target. In FIG. 2, virtual skeleton 46 is illustrated as a fifteen-joint stick figure. This illustration is for simplicity of understanding, not technical accuracy. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

As shown in FIG. 2, a virtual avatar 50 may be rendered on display device 16 as a visual representation of virtual skeleton 46. Because virtual skeleton 46 models human target 32, and the rendering of the virtual avatar 50 is based on the virtual skeleton 46, the virtual avatar 50 serves as a viewable digital representation of the human target 32. As such, movement of virtual avatar 50 on display device 16 reflects the movements of human target 32.

In some embodiments, only portions of a virtual avatar will be presented on display device 16. As one nonlimiting example, display device 16 may present a first person perspective to human target 32 and may therefore present the portions of the virtual avatar that could be viewed through the virtual eyes of the virtual avatar (e.g., outstretched hands holding a steering wheel, outstretched arms holding a rifle, outstretched hands grabbing a virtual object in a three-dimensional virtual world, etc.).

While virtual avatar 50 is used as an example aspect of a game that may be controlled by the movements of a human target via the skeletal modeling of a depth map, this is not intended to be limiting. A human target may be modeled with a virtual skeleton, and the virtual skeleton can be used to control aspects of a game or other application other than a virtual avatar. For example, the movement of a human target can control a game or other application even if a virtual avatar is not rendered to the display device.

As introduced above, a driving simulation or game may be controlled by the movements of a human target via the skeletal modeling of a depth map. For example, FIGS. 3-9 schematically show a virtual skeleton 46 modeling different gestures of a human target at different moments in time (e.g., time $t_0$, time $t_1$, and time $t_2$). As discussed above, virtual skeleton 46 can be derived from depth information acquired from a depth camera observing the human target. While virtual skeleton 46 is illustrated as a jointed stick figure, it is to be understood that the virtual skeleton may be represented by any suitable machine readable data structure. For example, the joints illustrated as dots in FIG. 3A may be represented by positional coordinates and/or other machine readable information. As such, a logic subsystem of a computing system may receive the virtual skeleton data structure(s) representing the virtual skeleton in machine readable form) and process the position and/or other attributes of one or more joints. In this way, the skeletal position/movement, and therefore the gestures of the modeled human target, may be interpreted as different gestured controls for controlling the computing system.

As a first example, FIG. 3A shows virtual skeleton 46 in a seated position with lowered arms at time $t_0$. In the illustrated embodiment, virtual skeleton includes, among other joints, a left hand joint 82, a right hand joint 84, a first torso joint 88, a left foot joint 92, and a right foot joint 94. At time $t_1$, the arms of the virtual skeleton are raised as if to hold a steering wheel. At time $t_2$, the arms are turned as if turning the steering wheel. FIG. 3B schematically shows a front view of left hand joint 82 and right hand joint 84 at time $t_1$. FIG. 3C schematically shows a front view of left hand joint 82 and right hand joint 84 at time $t_2$.

The computing system may be configured to translate an angle between a reference line (e.g., a horizon) and a line connecting the left hand joint and the right hand joint into a gestured steering angle control. In some embodiments, such a translation may only be performed if the right hand joint and the left hand joint are outstretched in front of one or more torso joints (i.e., the hands are in position to hold a steering wheel).

For example, as best illustrated in FIG. 3B, at time $t_1$, an angle 300 between a reference line 302 and a line 304 connecting the left hand joint 82 and the right hand joint 84 is approximately −2.0 degrees. As such, the observed and modeled −2.0 degree relative joint position may be modeled as a −2.0 degree steering angle control (e.g., steering wheel turned −2.0 degrees).

As another example, and as best illustrated in FIG. 3C, at time $t_2$, an angle 300 between reference line 302 and the line 304 connecting the left hand joint 82 and the right hand joint 84 is approximately 28.0 degrees. As such, the observed and modeled 28.0 degree relative joint position may be modeled as a 28.0 degree steering angle control (e.g., steering wheel turned 28.0 degrees).

Translation does not have to be 1:1. In some embodiments, an observed joint angle may be interpreted into a steering angle control using a linear or nonlinear translation function.

Figure 3D:
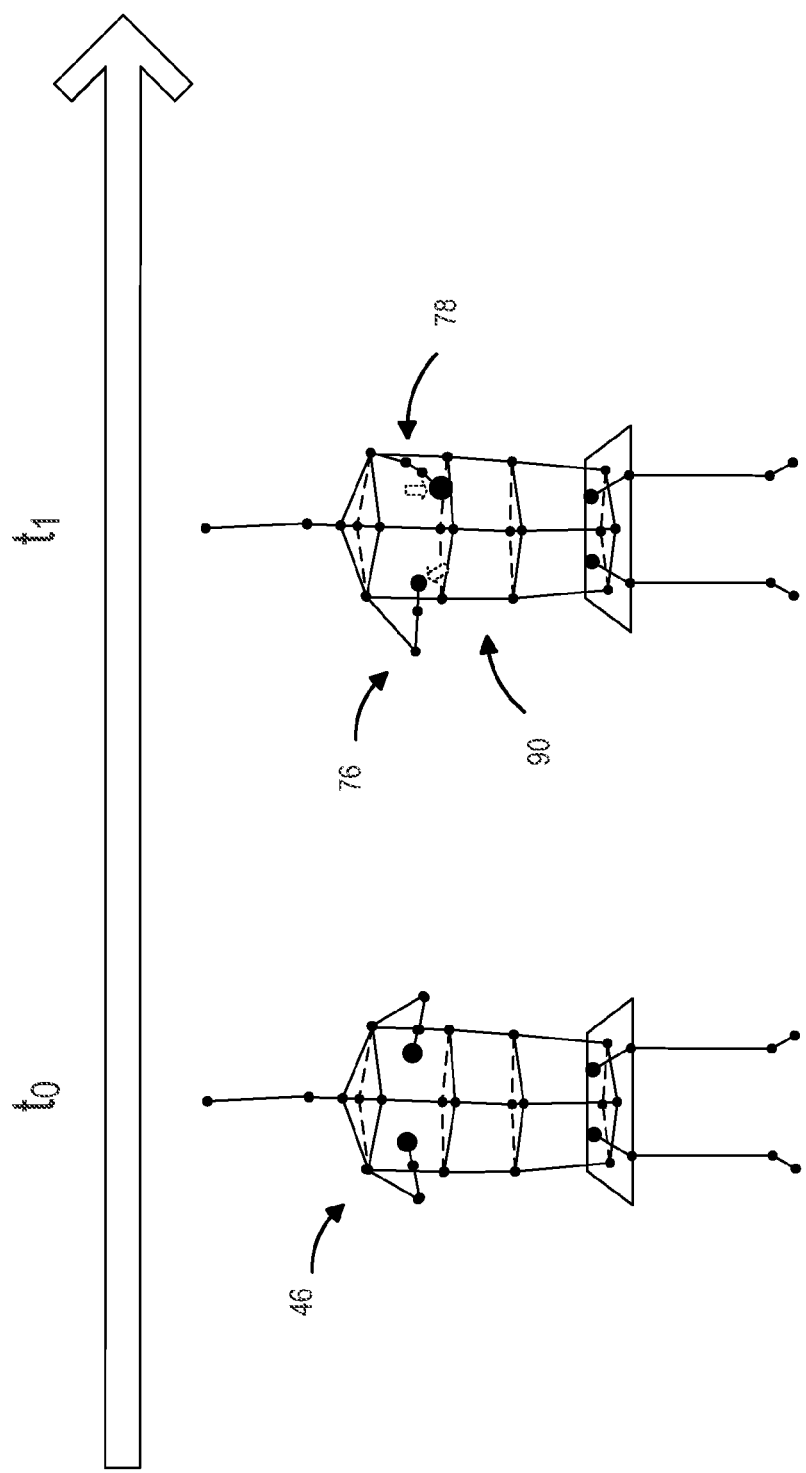

In some embodiments, as illustrated in FIG. 3D, a gestured steering angle control may be interpreted from the position of the arms in relation to the position of the torso. For example, at time $t_0$, virtual skeleton 46 is in a driving position. At time $t_1$, right arm 76 moves away from torso 90 as left arm moves closer to torso 90. The computing system may be configured to translate a position of a right arm and/or a left arm with respect to at least one torso joint into a gestured steering angle control. In this case, the gesture may be translated as a right turn. Likewise, right arm 76 moving closer to torso 90 as left arm 78 moves away from torso 90 may contribute to a gestured steering angle control for a left turn.

Figure 3E:
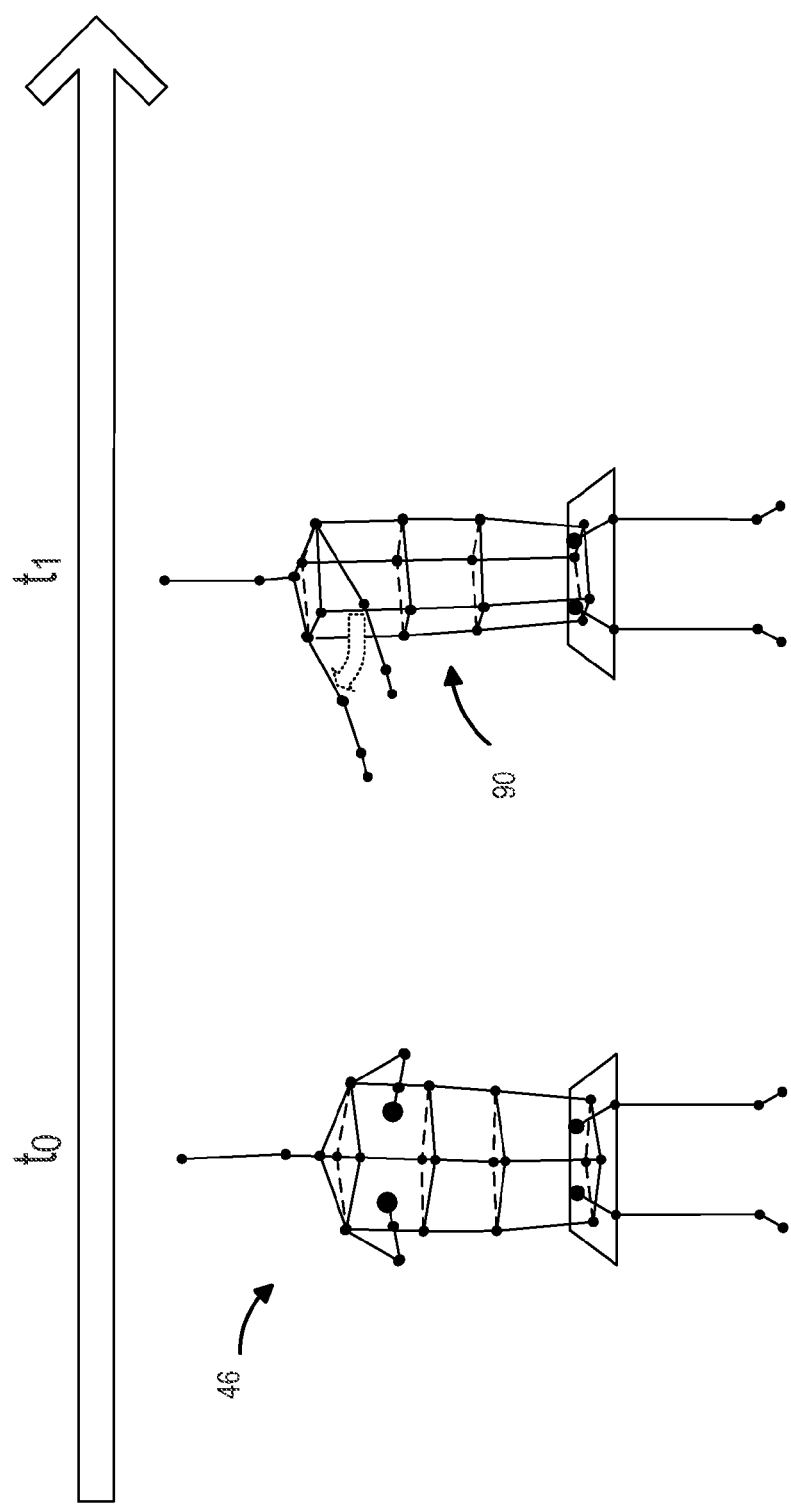

FIG. 3E provides an example of a gestured steering angle control interpreted from the position of the torso and/or shoulders. For example, at time $t_0$, virtual skeleton 46 is in a driving position. At time $t_1$, torso 90 rotates to the right. The computing system may be configured to translate a position of at least one torso joint or another indication of torso rotation into a gestured steering angle control. The gesture shown in FIG. 3E may be translated as a right turn. Likewise, the torso rotating to the left may be translated as a left turn. In some embodiments, the hand positioning relative to the torso may be interpreted as a gestured steering angle control. For example, when the hands are outstretched in front of the torso in a steering posture and then move to the right, this may be translated as a right turn, even if the torso does not twist with the hand movement. Likewise, hand movement to the left may be translated as a left turn.

FIG. 3F provides an example of a gestured steering angle control interpreted from a lateral tilt of the torso. For example, at time $t_0$, virtual skeleton 46 is in a driving position. At time $t_1$, torso 90 leans to the right. The computing system may be configured to translate a position of the tilt of the torso into a gestured steering angle control. The gesture shown in FIG. 3F may be translated as a right turn. Likewise, the torso leaning to the left may be translated as a left turn.

In some cases, a driving game and/or other driving simulation may be configured to translate two or more of the above described gestures into a steering angle control. As such, a game player may cause a virtual vehicle to turn using different types of gestures.

The gestured steering angle control can be used to steer a virtual vehicle of a driving game or other driving simulation. Such steering can be in proportion to the magnitude of the gestured steering angle control—i.e., higher angle steering gestures can result in sharper turns of the virtual vehicle.

In some embodiments, the gestured steering angle control is not the only steering control used to steer the virtual vehicle. A computing system may be programmed with an artificial intelligence that can determine steering controls, acceleration controls, and other controls for virtual vehicles. Such artificial intelligence may be used to automatically drive opponent race vehicles in a virtual racing game, for example. The artificial intelligence can be tuned to adhere to a specific driving profile (i.e., careful, reckless, skilled, etc.). Such artificial intelligence may also be used to help a game player drive a virtual vehicle in a driving simulation or game.

In other words, the virtual vehicle may also be steered in proportion to an artificial intelligence recommended control. When controlled in this manner, the virtual vehicle turns in proportion to a blend of both the gestured steering angle control and the artificial intelligence recommended control. In this way, the game player can control the vehicle, but the artificial intelligence can assist the game player so that the game player has a more enjoyable experience.

FIG. 4 illustrates a driving game that may be displayed on a display device, showing an example virtual vehicle 400A on virtual road 402. Virtual vehicle 400A may be controlled by the gestures of the modeled human target, as described above. Further, virtual vehicle 400A may be steered in proportion to an artificial intelligence recommended control and a gestured steering angle control.

A relative percentage of the gestured steering angle control and the artificial intelligence recommended control may be dynamically set according to one or more changeable game parameters. In other words, the driving simulator can modify, in real time, what percentage of steering control comes from the game player and what percentage comes from the artificial intelligence.

In some embodiments, a driver level (e.g., beginner, intermediate, advanced, professional, etc.) may serve as a changeable game parameter that is used to dynamically set the balance between gamer control and artificial intelligence control. In such embodiments, the relative percentage of the gestured steering angle control may be decreased to provide greater assistance to beginner drivers.

In some embodiments, a speed of the virtual vehicle may serve as a changeable game parameter that is used to dynamically set the balance between gamer control and artificial intelligence control. In such embodiments, the relative percentage of the gestured steering angle control may be decreased as the speed of the virtual vehicle increases.

In some embodiments, a turning radius of a virtual track may serve as a changeable game parameter that is used to dynamically set the balance between gamer control and artificial intelligence control. In such embodiments, the relative percentage of the gestured steering angle control may be decreased as the turning radius of the virtual track increases. In other words, as a track In some embodiments, a deviation from a recommended path may serve as a changeable game parameter that is used to dynamically set the balance between gamer control and artificial intelligence control. In such embodiments, the relative percentage of the gestured steering angle control may be decreased as the deviation from the recommended path increases. In other words, as the virtual car moves farther away from a recommended driving path (e.g., an optimal line on a race track), the artificial intelligence may exert more control to nudge the virtual vehicle back on track. Using the example of FIG. 4, virtual vehicle 400A may be steered predominantly as a result of player control because virtual vehicle 400A is on a recommended path 410. On the other hand, the percentage of artificial intelligence control nay be increased for virtual vehicle 400B because virtual vehicle 400B is severely deviating from recommended path 410.

While steering is provided as an example form of control that may be blended between gestured controls interpreted from a virtual skeleton and artificial intelligence controls, this is not limiting. Other aspects of a driving simulator or game may be implemented via blended control. For example, throttle control and/or brake control may be implemented as blended controls. In general, a position of one or more joints of a virtual skeleton may be translated into a gestured game control, and a blended game control that is a combination of the gestured game control and an artificial intelligence recommended control may be executed.

Figure 5:
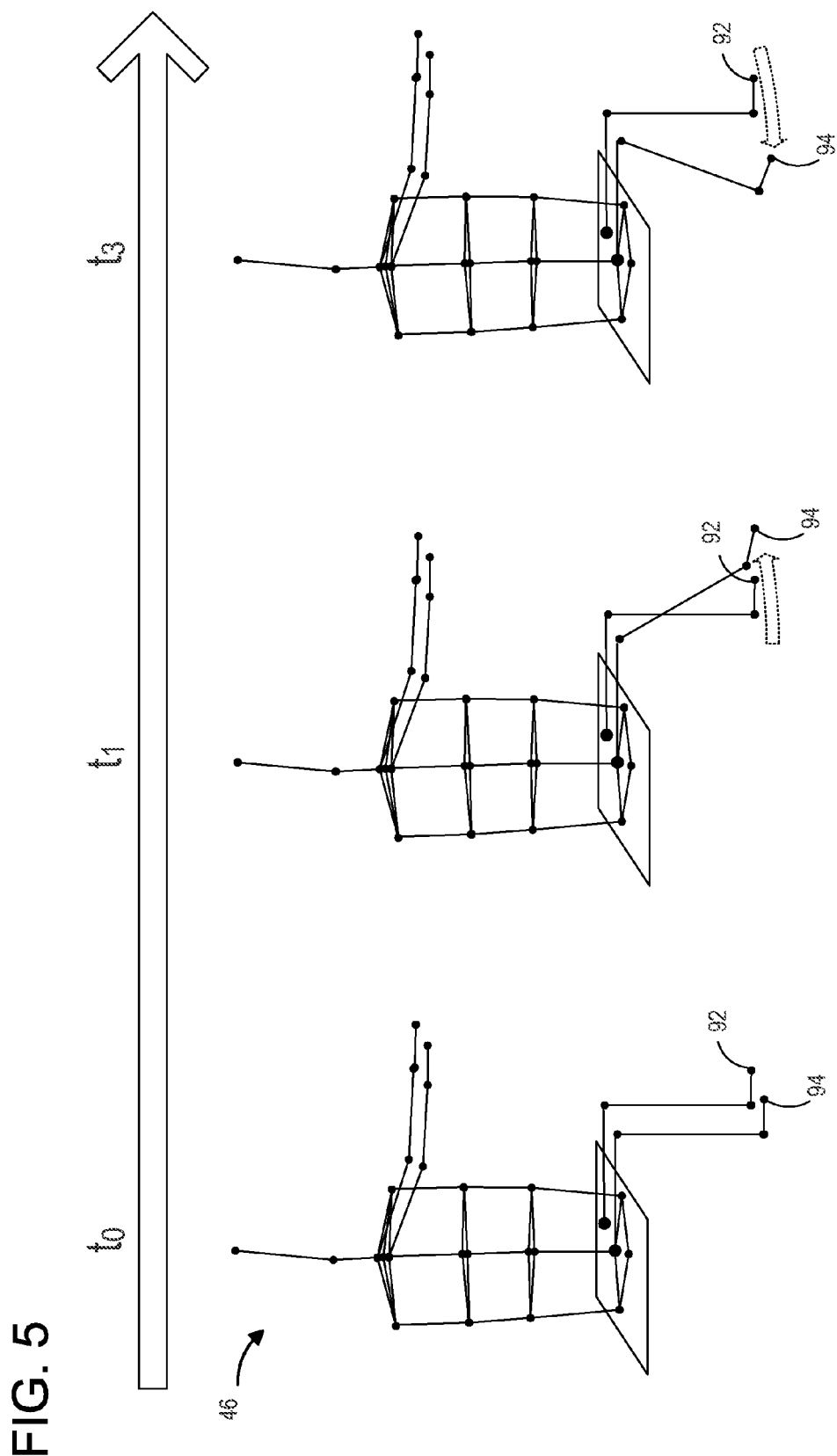
FIGS. 5-9 somewhat schematically show gestured driving controls as translated from a virtual skeleton.
Figure 6A:
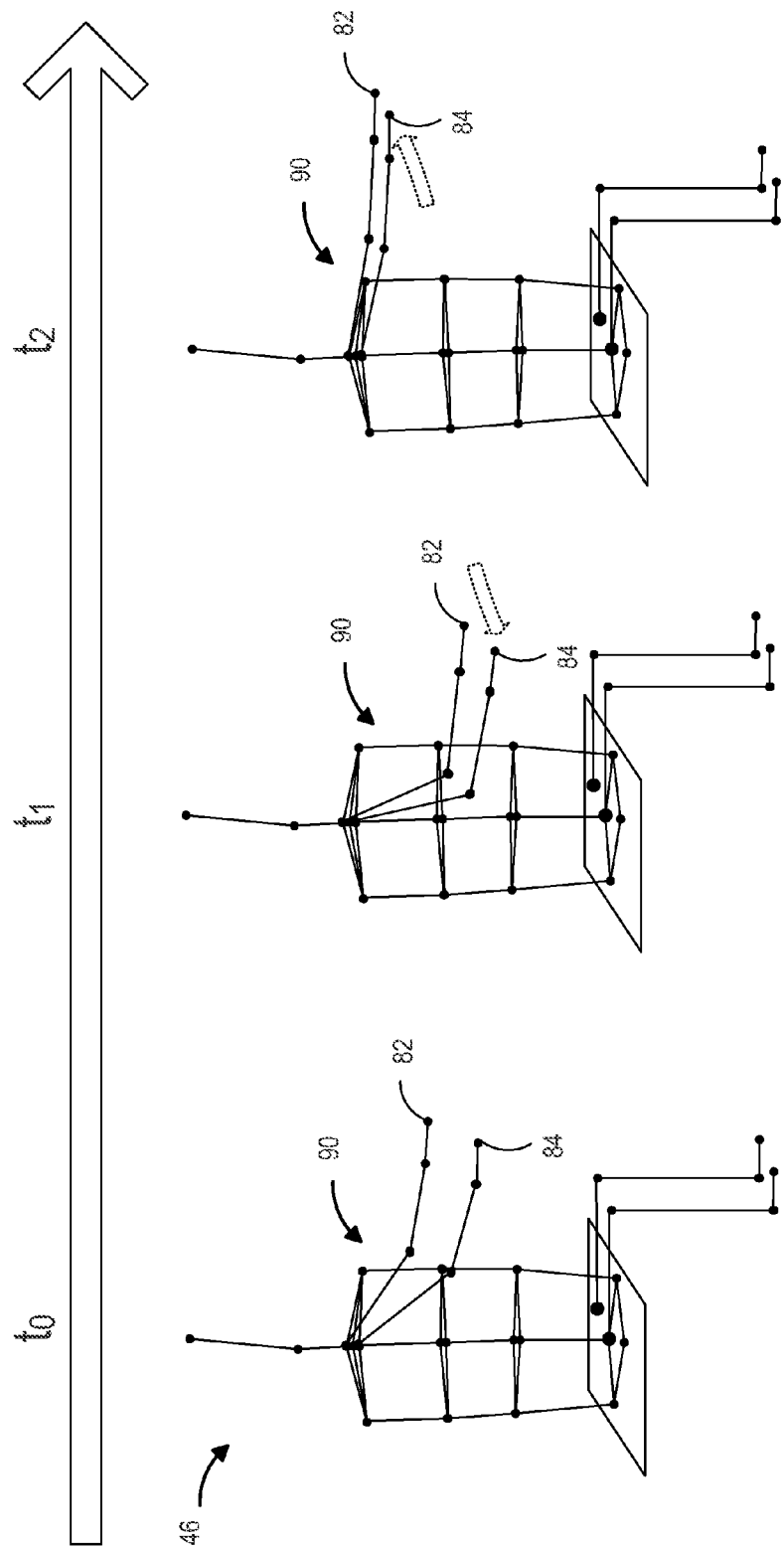
Figure 6B:
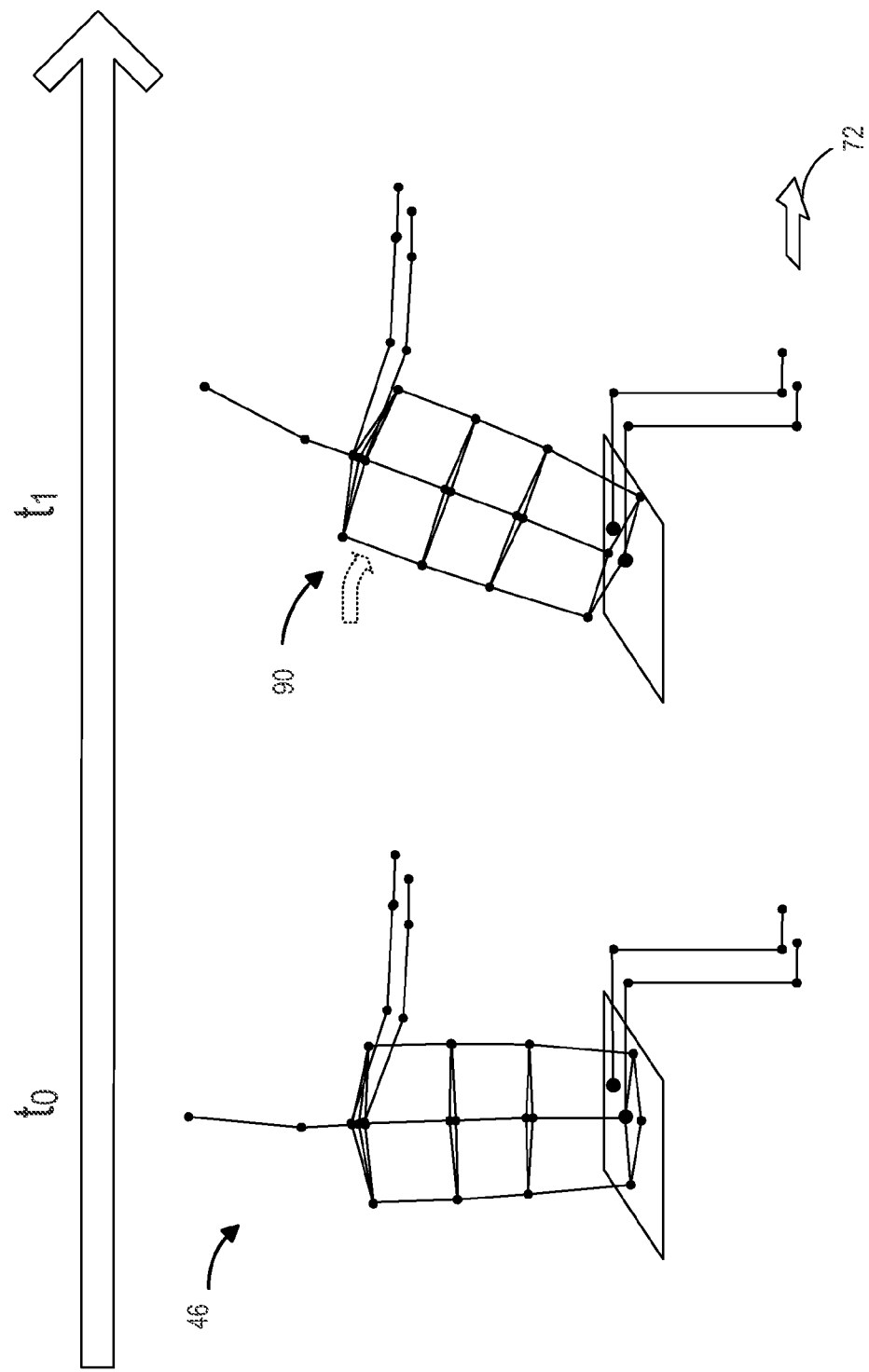

As a next example, FIGS. 5, 6A, and 6B show how throttle and braking controls may be implemented. In particular, FIG. 5 schematically shows a virtual skeleton 46 modeling different acceleration gestures of a human target at different moments in time (e.g., time $t_0$, time $t_1$ and time $t_2$). The computing system may be configured to translate a position of a left foot joint of the virtual skeleton relative to a position of a right foot joint of the virtual skeleton. Into a gestured acceleration control. Further, the virtual vehicle may be accelerated in proportion to the gestured acceleration control.

At time $t_0$, virtual skeleton 46 is shown with the left and right foot joints in a neutral position. This may correspond to a neutral acceleration control—i.e., coasting without any throttle or any brake, for example.

At time $t_1$, the right foot joint 94 is in front of the left foot joint 92. The right foot joint in front of the left foot joint may be translated as a positive acceleration—i.e., throttle on. The distance the right foot moves in front of the left foot may correspond to the magnitude of the throttle control.

At time $t_2$, right foot joint 94 is behind left foot joint 92. The right foot joint behind the left foot joint may be translated as a negative acceleration—i.e., brake on. The distance the right foot moves behind the left foot may correspond to the magnitude of the brake control.

It is to be understood that references to "left," "right," "front," "back," and the like are based on the anatomy of the virtual skeleton. Further, while an active right foot is used in this example, it is to be understood that acceleration control may additionally or alternatively be implemented with the left foot. Further, while absolute controls are discussed (i.e., throttle on/off, brake on/off), it should be appreciated that gestured acceleration controls may be relative to a default speed, such as a default speed selected by an artificial intelligence.

FIG. 6A schematically shows a virtual skeleton 46 modeling different acceleration gestures of a human target at different moments in time (e.g., time $t_0$, time $t_1$, and time $t_2$). The computing system may be configured to translate a distance of the left hand joint and the right hand joint away from one or more torso joints into a gestured acceleration control. Further, the virtual vehicle may be accelerated in proportion to the gestured acceleration control.

At time $t_0$, virtual skeleton 46 is shown with the left and right hand joints in a neutral position. This may correspond to a neutral acceleration control—i.e., coasting without any throttle or any brake, for example. At time the hands (i.e., left hand joint 82, and right hand joint 84) move closer to the torso. At time $t_2$, the hands move farther from torso 90.

Positive acceleration may be increased in proportion to the distance of the left hand joint and the right hand joint away from the one or more torso joints. For example, positive acceleration may be higher at time $t_1$ than at times $t_0$ and $t_2$. Likewise, positive acceleration may be lower at time $t_1$ than at times $t_0$ and $t_2$. In some embodiments, hand extension away from the torso past a threshold distance may be interpreted as positive acceleration and hand retraction towards the torso relative to the threshold distance may be interpreted as negative acceleration (i.e., braking).

FIG. 6B provides an example of a gestured acceleration control interpreted from the position of the torso. For example, at time $t_0$, virtual skeleton 46 is in a driving position. At time $t_1$, torso 90 leans forward. In other words, torso 90 leans towards the capture device, as denoted by arrow 72, thus positioning torso 90 closer to the capture device (e.g. depth camera 22 of FIG. 1). The computing system may be configured to translate a distance of the torso from the capture device into a gestured acceleration control. The gesture as shown in FIG. 6B may be translated as a positive acceleration. Likewise, the torso leaning backward may be translated as a negative acceleration.

In some cases, a driving game and/or other driving simulation may be configured to translate two or more of the above described gestures into a acceleration control. As such, a game player may cause a virtual vehicle to speed up or slow down using different types of gestures.

As before, it should be appreciated that gestured acceleration controls may be relative to a default speed, such as a default speed selected by an artificial intelligence. Further, while the hand position is described above with reference to the position of one or more torso joints, it should be understood that any other equivalent and/or compatible reference may be used, including the absolute position of the hand joints.

While gestured steering and acceleration controls are two example types of controls that may be translated from a virtual skeleton, other gestured controls are within the scope of this disclosure. The following nonlimiting examples are provided to suggest the breadth of gestured controls that are available, but in no way are meant to be limiting.

Figure 7:
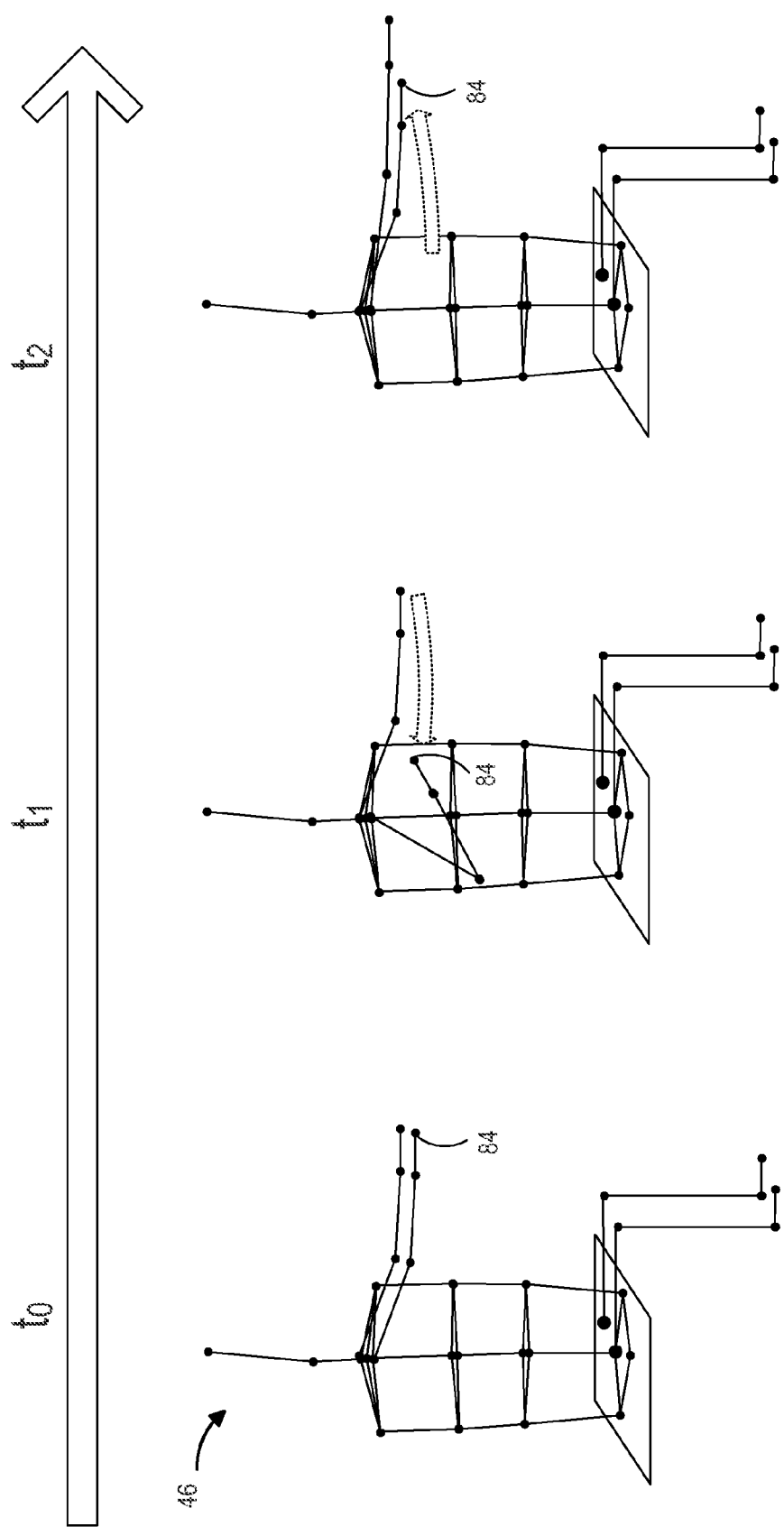

FIG. 7 schematically shows a virtual skeleton 46 modeling example turbo boost gestures of a human target throughout different moments in time (e.g., time $t_0$, time $t_1$, and time $t_2$). The computing system may be configured to translate a sudden movement of a hand joint (e.g., right hand joint 84) from near one or more torso joints (i.e., at time $t_1$) to a position away from the one or more torso joints at time $t_2$) into a gestured turbo boost control. Further, the virtual vehicle may be rapidly accelerated in response to the gestured turbo boost control.

Figure 8:
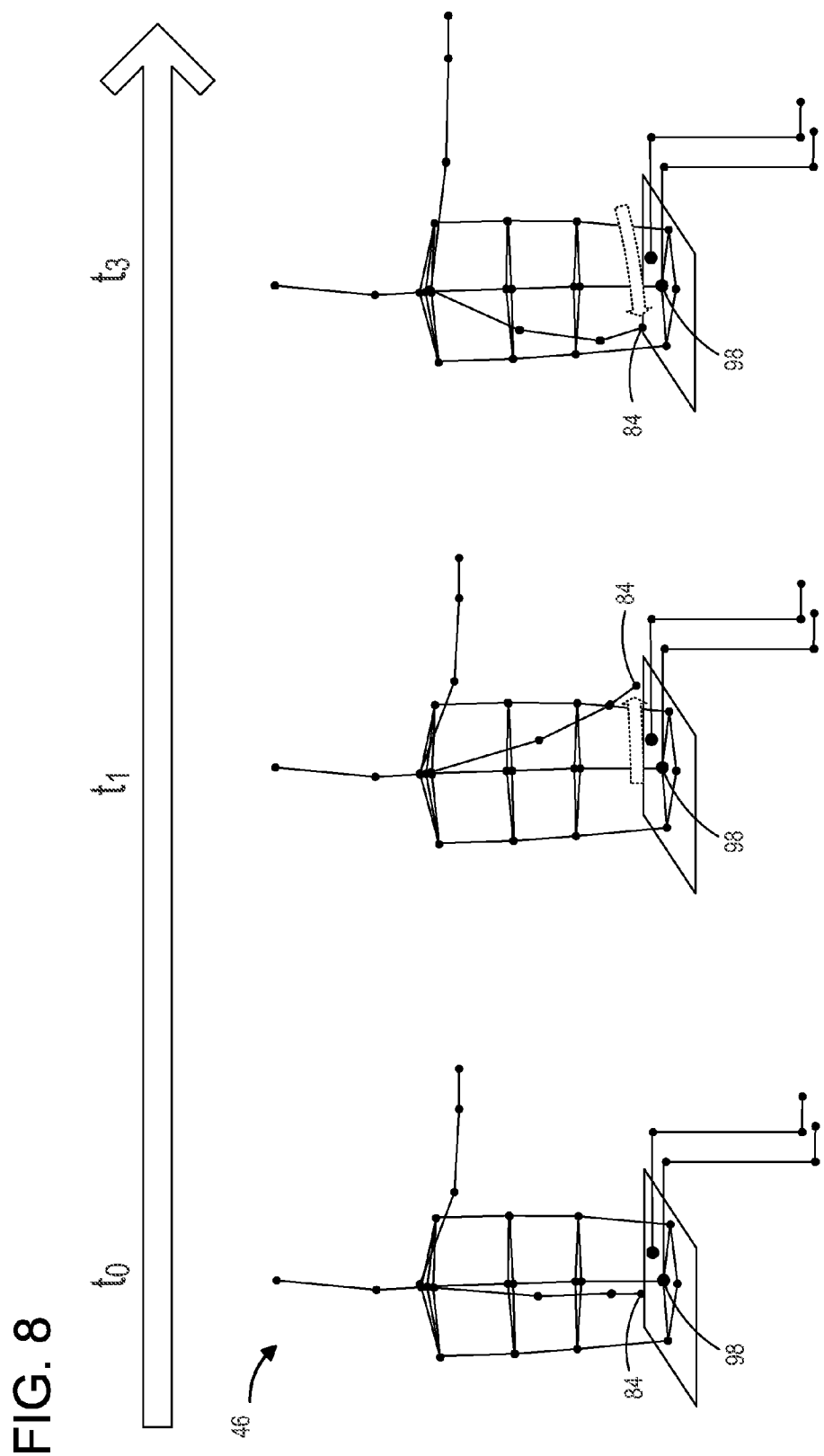

FIG. 8 schematically shows a virtual skeleton 46 modeling example gear shift gestures of a human target throughout different moments in time (e.g., time $t_0$, time $t_1$, and time $t_2$). The computing system may be configured to translate a movement of a hand joint (e.g., right hand joint 84) near a hip joint (e.g., hip joint 98) into a gestured gear shift control. As such, a gear of the virtual vehicle may be changed in response to the gestured gear shift control.

Figure 9:
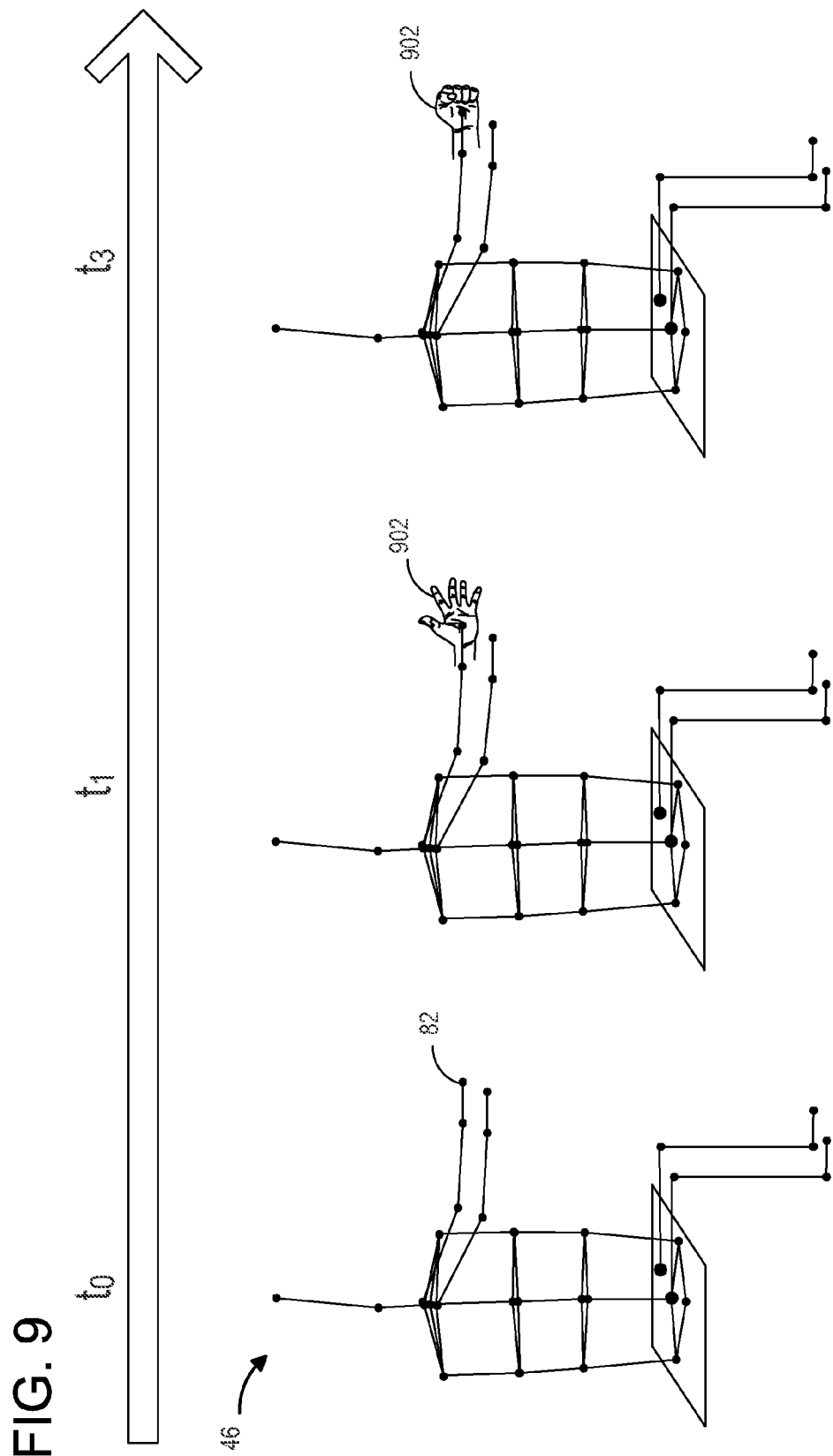

At time $t_0$, virtual skeleton 46 is shown with right hand joint 84 in a neutral gear shift position. At time the right hand joint 84 may move forward relative to lip joint 98, which may translate as a gear increase. At time $t_2$, the right hand joint 84 may move backwards relative to hip joint 98, which may translate as a gear decrease. FIG. 9 schematically shows a virtual skeleton 46 modeling other example gear shift postures of a human target throughout different moments in time (e.g., time $t_0$ time $t_1$, and time $t_2$). At time $t_0$, virtual skeleton 46 is shown with hands in a neutral gear shift position. The computing system may be configured to translate a posture of one or more hands modeled by corresponding hand joints (e.g., left hand joint 82) into a gestured gear shift control. As such, a gear of the virtual vehicle may be changed in response to the gestured gear shift control. For example, the gear may be decreased responsive to an opening and closing of left hand 902. As another example, the gear may be increased responsive to an opening and closing of a right, hand.

The posture of a hand may be determined in any suitable manner. In some embodiments, a hand may be modeled with enough skeletal joints to recognize the posture of the hand from the skeletal data alone. In some embodiments, the position of the hand joint may be used to locate the position of the hand in the corresponding depth map and/or corresponding color image. In such cases, the portion of the depth map and/or color image including the hand may then be evaluated to determine if the hand is in an open or closed posture. For example, the portion of the depth map and/or color image including the hand may be analyzed with reference to a prior trained collection of known hand postures to find a best match hand posture.

The above described gesture/controls are nonlimiting examples. Other gestures and controls are within the scope of this disclosure. Furthermore, two or more of the above described gestures may be simultaneously executed and translated. For example, a game player may cause a virtual vehicle to accelerate around a corner by simultaneously moving a right foot forward, raising an outstretched left hand relative to an outstretched right, hand, while opening and closing the outstretched right hand.

While described with reference to a driving simulation, the gestures described above may be applied to other games or applications. Furthermore, the gestures described above may be used to control physical objects, such as remotely operated vehicles or drones.

While the gestures described above are described with reference to the visual representation of the virtual skeletons, it is to be understood that the gestures may be analyzed with reference to the skeletal data that constitutes the virtual skeleton. Each gesture may be analyzed using one or more tests. Each such test may consider the position, velocity, acceleration, orientation, or other attributes of one or more joints. Such attributes may be considered in an absolute sense, or with reference to one or more other joints. As nonlimiting examples, gesture may be identified by the absolute position of a joint, the relative positions of two or more joints with respect to one another, the angle of a bone segment connecting two joints relative to the angle of another bone segment connecting two joints, and/or a combination of the above or other attributes.

In some embodiments, the above described methods and processes may be tied to a computing system including one or more computers. In particular, the methods and processes described herein may be implemented as a computer application, computer service, computer API, computer library, and/or other computer program product.

Figure 10:
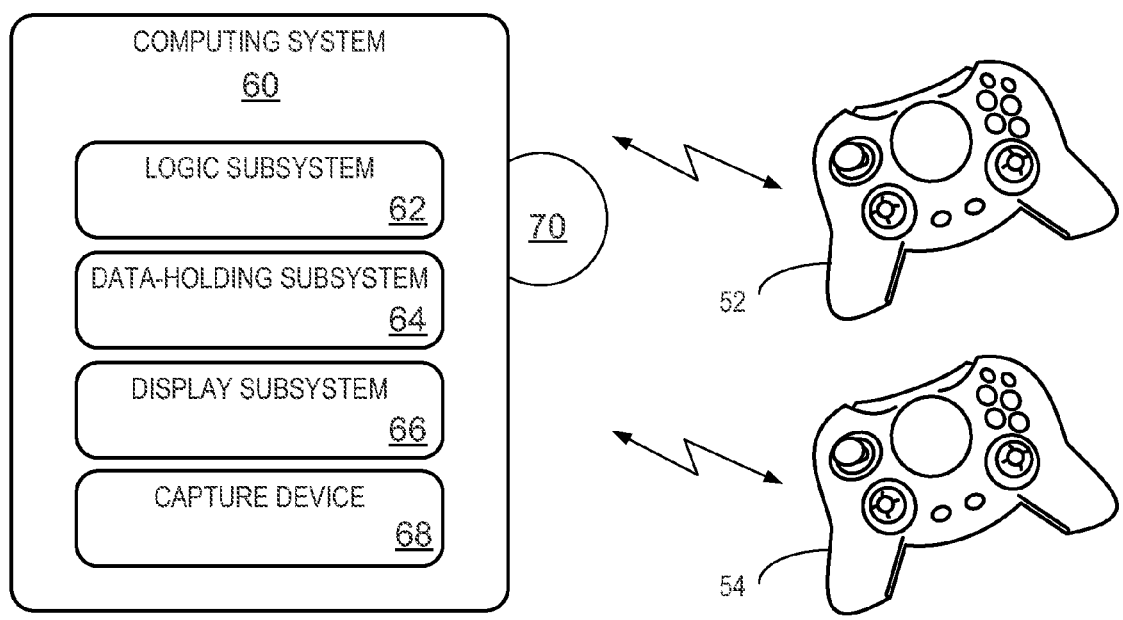
FIG. 10 schematically shows a computing system configured to translate a virtual skeleton into gestured driving controls.

FIG. 10 schematically shows a nonlimiting computing system. 60 that may perform one or more of the above described methods and processes. Computing system 60 is shown in simplified form. It is to be understood that virtually any computer architecture may be used without departing from the scope of this disclosure. In different embodiments, computing system 60 may take the form of a mainframe computer, server computer, desktop computer, laptop computer, tablet computer, home entertainment computer, network computing device, mobile computing device, mobile communication device, gaming device, etc.

Computing system 60 includes a logic subsystem 62 and a data-holding subsystem 64. Computing system 60 may optionally include a display subsystem 66, capture device 68, and/or other components not shown in FIG. 10. Computing system 60 may also optionally include user input devices such as keyboards, mice, game controllers, cameras, microphones, and/or touch screens, for example.

Logic subsystem 62 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 64 may include one or more physical, non-transitory, devices configured to hold data and/or instructions executable by the logic subsystem to implement the herein described methods and processes. When such methods and processes are implemented, the state of data-holding subsystem 64 may be transformed (e.g., to hold different data).

Data-holding subsystem 64 may include removable media and/or built-in devices. Data-holding subsystem 64 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 64 may include devices with one or more of the following characteristics: volatile, nonvolatile, dynamic, static, read/write, read-only, random access, sequential access, location addressable, file addressable, and content addressable. In some embodiments, logic subsystem 62 and data-holding subsystem 64 may be integrated into one or more common devices, such as an application specific integrated circuit or a system on a chip.

FIG. 10 also shows an aspect of the data-holding subsystem in the form of removable computer-readable storage media 70, which may be used to store and/or transfer data and/or instructions executable to implement the herein described methods and processes. Removable computer-readable storage media 70 may take the form of CDs, DVDs, HD-DVDs, Biu-Ray Discs, EEPROMs, and/or floppy disks, among others.

It is to be appreciated that data-holding subsystem 64 includes one or more physical, non-transitory devices. In contrast, in some embodiments aspects of the instructions described herein may be propagated in a transitory fashion by a pure signal (e.g., an electromagnetic signal, an optical signal, etc) that is not held by a physical device for at least a finite duration. Furthermore, data and/or other forms of information pertaining to the present disclosure may be propagated by a pure signal.

When included, display subsystem 66 may be used to present a visual representation of data held by data-holding subsystem 64 (e.g., a virtual avatar and/or a three-dimensional virtual world). As the herein described methods and processes change the data held by the data-holding subsystem, and thus transform the state of the data-holding subsystem, the state of display subsystem 66 may likewise be transformed to visually represent changes in the underlying data. For example, computing system 60 may be configured to render a driving game for display on a display device of display subsystem 66. As such, computing system 60 may include a display output to output the driving game interface to the display device. Display subsystem 66 may include one or more display devices utilizing virtually any type of technology. Such display devices may be combined with logic subsystem 62 and/or data-holding subsystem 64 in a shared enclosure, or such display devices may be peripheral display devices connected to the logic subsystem via a display output.

When included, a communication subsystem may be configured to communicatively couple computing system 60 with one or more other computing devices. The communication subsystem may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 60 to send and/or receive messages to and/or from other devices via a network such as the Internet.

Computing system 60 further may include an integrated and/or peripheral capture device 68 configured to obtain depth-images of one or more targets. In either case, computing system 60 may include a peripheral input to receive depth images from a depth camera and deliver the received depth images to the logic subsystem for processing. Capture device 68 may be configured to capture video with depth information via any suitable technique (e.g., time-of-flight, structured light, stereo image, etc.). As such, capture device 68 may include a depth camera, a video camera, stereo cameras, and/or other suitable capture devices.

For example, in time-of-flight analysis, the capture device 68 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by capture device 68 to capture depth information. In such an analysis, patterned light (i.e., light displayed as a known pattern such as grid pattern, a stripe pattern, a constellation of dots, etc.) may be projected onto the target. Upon striking the surface of the target, the pattern may become deformed, and this deformation of the pattern may be studied to determine a physical distance from the capture device to a particular location on the target.

In another example, the capture device may include two or more physically separated cameras that view a target from different angles to obtain visual stereo data. In such cases, the visual stereo data may be resolved to generate a depth-image.

In other embodiments, capture device 68 may utilize other technologies to measure and/or calculate depth values. Additionally, capture device 68 may organize the calculated depth information into "Z layers," i.e., layers perpendicular to a Z axis extending from the depth camera along its line of sight to the target.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic. Computing system 60 may optionally include one or more input devices, such as controller 52 and controller 54. Input devices may be used to control operation of the computing system. In the context of a game, input devices, such as controller 52 and/or controller 54 can be used to control aspects of a game not controlled via the target recognition, tracking, and analysis methods and procedures described herein. In some embodiments, input devices such as controller 52 and/or controller 54 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be chanced.

The subject matter of the present disclosure includes all novel and nonobvious combinations and subcombinations of the various processes, systems and configurations, and other features, functions, ads, and/or properties disclosed herein, as well as any and all equivalents thereof.

The invention claimed is:

1. A data holding device holding instructions executable by a logic sub system to:
   render a driving game for display on a display device;
   receive a virtual skeleton including a plurality of joints, the plurality of joints including a left hand joint and a right hand joint, the virtual skeleton providing a machine readable representation of a human target observed with a three-dimensional depth camera;
   translate an angle between a reference line and a line connecting the left hand joint and the right hand joint into a gestured steering angle control; and
   steer a virtual vehicle of the driving game in proportion to the gestured steering angle control.

2. The data holding device of claim 1, further holding instructions executable by the logic subsystem to also steer the virtual vehicle in proportion to an artificial intelligence recommended control such that the virtual vehicle turns in proportion to a blend of both the gestured steering angle control and the artificial intelligence recommended control.

3. The data holding device of claim 2, wherein a relative percentage of the gestured steering angle control and the artificial intelligence recommended control is dynamically set according to one or more changeable game parameters.

4. The data holding device of claim 3, wherein the one or more changeable game parameters includes a speed of the virtual vehicle, and wherein the relative percentage of the gestured steering angle control decreases as the speed of the virtual vehicle increases.

5. The data holding device of claim 3, wherein the one or more changeable game parameters includes a turning radius of a virtual track, and wherein the relative percentage of the gestured steering angle control decreases as the turning radius of the virtual track increases.

6. The data holding device of claim 3, wherein the one or more changeable game parameters includes a deviation from a recommended path, and wherein the relative percentage of the gestured steering angle control decreases as the deviation from the recommended path increases.

7. The data holding device of claim 1, further holding instructions executable by the logic subsystem to:
   translate a position of a left foot joint of the virtual skeleton relative to a position of a right foot joint of the virtual skeleton into a gestured acceleration control; and
   accelerate the virtual vehicle in proportion to the gestured acceleration control.

8. The data holding device of claim 7, wherein a right foot joint in front of the left foot joint is translated as a positive acceleration, and a right foot joint behind the left foot joint is translated as a negative acceleration.

9. The data holding device of claim 1, further holding instructions executable by the logic subsystem to:
   translate a distance of the left hand joint and the right hand joint away from one or more torso joints into a gestured acceleration control; and
   accelerate the virtual vehicle in proportion to the gestured acceleration control.

10. The data holding device of claim 9, wherein positive acceleration increases in proportion to the distance of the left hand joint and the right hand joint away from the one or more torso joints.

11. The data holding device of claim 1, further holding instructions executable by the logic subsystem to:
    translate a sudden movement of a hand joint from near one or more torso joints to a position away from the one or more torso joints into a gestured turbo boost control; and
    rapidly accelerating the virtual vehicle in response to the gestured turbo boost control.

12. The data holding device of claim 1, further holding instructions executable by the logic subsystem to:
    translate a movement of a hand joint near a hip joint into a gestured gear shift control; and
    changing a gear of the virtual vehicle in response to the gestured gear shift control.

13. The data holding device of claim 12, wherein the gear is increased responsive to a forward movement of the hand joint and the gear is decreased responsive to a backwards movement of the hand joint.

14. The data holding device of claim 1, further holding instructions executable by the logic subsystem to:
    translate a posture of one or more hands modeled by corresponding hand joints of the virtual skeleton into a gestured gear shift control; and
    changing a gear of the virtual vehicle in response to the gestured gear shift control.

15. The data holding device of claim 14, wherein the gear is increased responsive to an opening and closing of a right hand and the gear is decreased responsive to an opening and closing of a left hand.

16. The data holding device of claim 1, wherein the angle between a reference line and the line connecting the left hand joint and the right hand joint is translated into a gestured steering angle control only if the right hand joint and the left hand joint are outstretched in front of one or more torso joints.

17. An entertainment system, comprising:
    a peripheral input to receive depth images from a depth camera;
    a display output to output a driving game interface to a display device;
    a logic subsystem operatively connectable to the depth camera via the peripheral input and to the display device via the display output;
    a data holding subsystem holding instructions executable by the logic subsystem to:
      receive from the depth camera one or more depth images of a world space scene including a human target;
      model the human target with a virtual skeleton including a plurality of joints, the plurality of joints including a left hand joint, a right hand joint, one or more torso joints, a left foot joint, and a right foot joint;
      if the right hand joint and the left hand joint are outstretched in front of the one or more torso joints:
        translate an angle between a horizon and a line connecting the left hand joint and the right hand joint into a gestured steering angle control, and
        steer a virtual vehicle in proportion to the gestured steering angle control;
      translate a position of the left foot joint relative to a position of the right foot joint into a gestured acceleration control; and
      accelerate the virtual vehicle in proportion to the gestured acceleration control.

18. The entertainment system of claim 17, wherein the data holding subsystem further holds instructions executable by the logic subsystem to also steer the virtual vehicle in proportion to an artificial intelligence recommended control such that the virtual vehicle turns in proportion to a blend of both the gestured steering angle control and the artificial intelligence recommended control.

19. The entertainment system of claim 18, wherein a relative percentage of the gestured steering angle control and the artificial intelligence recommended control is dynamically set according to one or more changeable game parameters.

* * * * *